(12) United States Patent
Nagasaki (10) Patent No.: US 7,650,906 B2
(45) Date of Patent: Jan. 26, 2010

(54) VALVE APPARATUS HAVING O-RING

(75) Inventor: Kanehisa Nagasaki, Ichinomiya (JP)

(73) Assignee: DENSO Corporation, Kariya (JP)

( * ) Notice: Subject to any disclaimer, the term of this patent is extended or adjusted under 35 U.S.C. 154(b) by 515 days.

(21) Appl. No.: 11/526,718

(22) Filed: Sep. 26, 2006

(65) Prior Publication Data
US 2007/0068585 A1 Mar. 29, 2007

(30) Foreign Application Priority Data
Sep. 26, 2005 (JP) .............................. 2005-278354

(51) Int. Cl.
*F16K 31/06* (2006.01)
(52) U.S. Cl. ................................. 137/596.17
(58) Field of Classification Search ............ 137/625.65, 137/625.25, 625.26, 375, 596.17, 596.1; 251/368, 129.14, 367
See application file for complete search history.

(56) References Cited

U.S. PATENT DOCUMENTS 6,206,038 B1 * 3/2001 Klein et al. ............ 137/596.17
6,321,767 B1 * 11/2001 Seid et al. ................ 137/15.21
6,378,840 B1 4/2002 Watanabe et al.
6,598,852 B2 * 7/2003 Tomoda et al. ......... 251/129.19

\* cited by examiner

*Primary Examiner*—John Rivell
*Assistant Examiner*—Craig M Schneider
(74) *Attorney, Agent, or Firm*—Nixon & Vanderhye P.C.

(57) ABSTRACT

A valve apparatus is adapted to be at least partially inserted into an insertion hole of a counterpart member. The valve apparatus includes a housing and an O-ring. The housing is adapted to be inserted from an outside of the insertion hole into the insertion hole. The housing and the insertion hole define an annular gap therebetween. The O-ring seals the annular gap. The housing includes a substantially cylindrical base metallic member inserted into the insertion hole and an outer resin member. The outer resin member is fixed to the base metallic member, and at least partially defines an outer circumferential periphery of the housing. The base metallic member defines a bottom surface of a groove that supports the O-ring. The bottom surface of the groove is exposed circumferentially throughout from the outer resin member. The outer resin member defines a wall that restricts the O-ring from axially moving.

20 Claims, 4 Drawing Sheets

VALVE APPARATUS HAVING O-RING

CROSS REFERENCE TO RELATED APPLICATIONS

This application is based on and incorporates herein by reference Japanese Patent Application No. 2005-278354 filed on Sep. 26, 2005.

FIELD OF THE INVENTION

The present invention relates to a valve apparatus having an O-ring.

BACKGROUND OF THE INVENTION

For example, a three-way valve includes a valve housing having an inlet port, an outlet port, and an exhaust port. Fluid is supplied into the three-way valve through the inlet port. The three-way valve distributes the fluid through the outlet port. The three-way valve partially exhausts the fluid to a low pressure component through the exhaust port. The valve housing is inserted into an insertion hole. The valve housing and the insertion hole define an annular gap therebetween. The annular gap is sealed using multiple O-rings. The multiple O-rings are supported by the outer circumferential periphery of the valve housing.

According to U.S. Pat. No. 6,378,840 (JP-A-2001/82625), the valve housing is molded of resin for reducing manufacturing cost of the valve housing in a complicated shape. The valve housing has a valve seat. The valve seat is made of metal for producing strength. Components of the valve housing other than the valve seat are molded of resin for forming the complicated shape. In general, mechanical strength of resin is lower than mechanical strength of metal. Accordingly, when excessive force is applied to the valve housing, the resin components constructing the valve housing may crack. Consequently, oil may leak to the outside.

When the valve housing is formed of metal, reliability of the valve housing can be enhanced against external force. However, it is necessary to secondarily apply machining work to the outer circumferential periphery of the metallic valve housing for undercutting O-ring grooves. Accordingly, manufacturing cost of the valve housing increases.

Alternatively, it is conceivable to provide a base metallic member as an interior of the valve housing, and to provide an outer resin member as an exterior of the valve housing having a complicated shape defining the O-ring grooves.

However, the thermal expansion coefficients of the outer resin member and the base metallic member are different from each other. Accordingly, in this structure, when the valve housing is exposed to cool and hot environment, a gap may arise in the boundary between the outer resin member and the base metallic member, which tightly make contact with each other. When a gap arises in the boundary, fluid may leak to the outside through the gap. When excessive force is applied to the valve housing, the outer resin member, which is lower than the base metallic member in mechanical strength, may crack, and fluid may leak to the outside through the gap.

SUMMARY OF THE INVENTION

The present invention addresses the above disadvantage. According to one aspect of the present invention, a valve apparatus is adapted to be at least partially inserted into an insertion hole of a counterpart member. The valve apparatus includes a housing that is adapted to be inserted from an outside of the insertion hole into the insertion hole. The housing and the insertion hole define an annular gap therebetween. The valve apparatus further includes at least one O-ring that seals the annular gap. The housing includes a base metallic member and an outer resin member. The base metallic member is substantially cylindrical. The base metallic member is inserted into the insertion hole. The outer resin member is fixed to the base metallic member. The outer resin member at least partially defines an outer circumferential periphery of the housing. The base metallic member defines a bottom surface of a groove that supports the at least one O-ring. The bottom surface of the groove is exposed circumferentially throughout from the outer resin member. The outer resin member defines a resin wall that restricts the at least one O-ring from axially moving.

According to another aspect of the present invention, a valve apparatus includes a housing. The valve apparatus further includes at least one O-ring that is provided to an outer periphery of the housing. The housing includes a base metallic member and an outer resin member. The base metallic member is substantially cylindrical. The outer resin member partially surrounds an outer circumferential periphery of the base metallic member. The outer resin member and the outer circumferential periphery of the base metallic member define a groove having a bottom surface. The outer circumferential periphery of the base metallic member defines the bottom surface that is exposed circumferentially throughout from the outer resin member. The outer resin member defines a resin wall being adjacent to the bottom surface. The at least one O-ring circumferentially surrounds the bottom surface. The resin wall axially faces to the at least one O-ring.

The O-ring may have an inner circumferential periphery that makes contact directly with the bottom surface.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
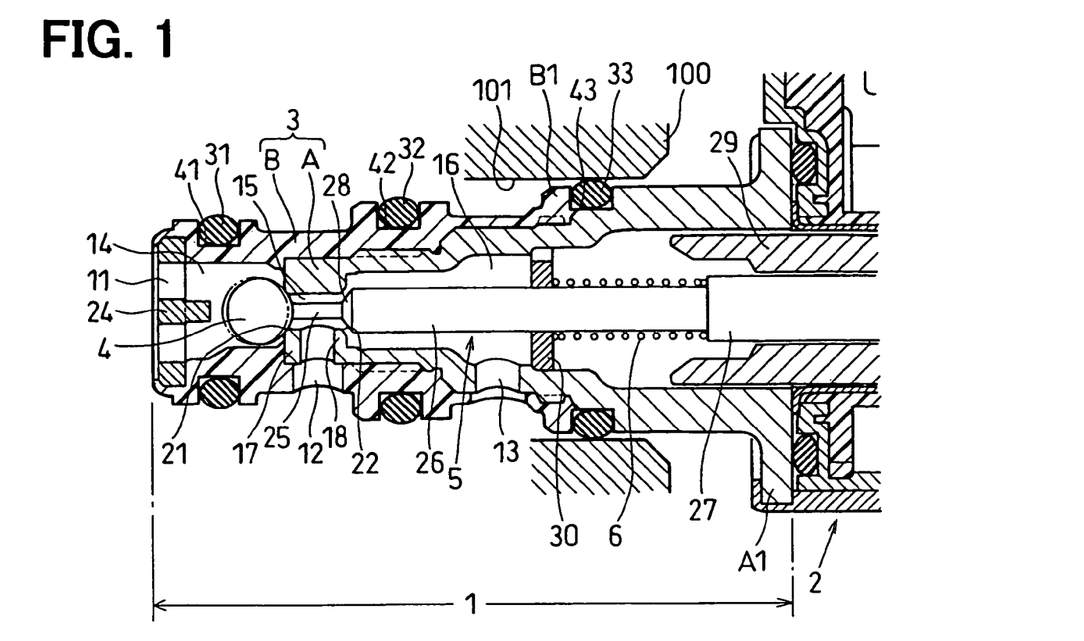
FIG. 1 is a longitudinal partially sectional view showing a solenoid valve according to a first embodiment.

The structure of a three-way solenoid valve is described in reference to FIG. 1. The three-way solenoid valve is an example of a valve apparatus, an electric valve apparatus, and a three-way electric valve. The three-way solenoid valve controls hydraulic pressure and/or a flow amount of oil, for example. In this example, the three-way solenoid valve is assembled to a metallic case 100 that has an oil passage. The metallic case 100 is, for example, applied to a hydraulic controller for operating hydraulic pressure of an automatic transmission in an automobile. The metallic case 100 is an example of a counterpart member. The three-way solenoid valve includes a passage switching device 1 and a solenoid actuator 2. The solenoid actuator 2 operates the passage switching device 1. The solenoid actuator 2 is an example of an electric actuator.

In this example, the three-way solenoid valve has a normally close (N/C) structure. In this normally close (N/C) structure, when the solenoid actuator 2 is turned OFF so that supplying electricity to the solenoid actuator 2 is terminated, communication between an inlet port 11 and an outlet port 12 becomes minimum, and communication between the outlet port 12 and an exhaust port 13 becomes maximum.

The passage switching device 1 includes a valve housing (valve base) 3, a ball valve 4, a shaft 5, and a return spring 6. The valve housing 3 is in a substantially cylindrical shape. The valve housing 3 is inserted into an insertion hole 101 of the metallic case 100 from the exterior of the metallic case 100.

The valve housing 3 includes the inlet port 11, the outlet port 12, and the exhaust port 13. Oil is press-fed from an oil pump (not shown) into the inlet port 11. Oil is an example of fluid. The oil flows into an external apparatus such as a hydraulically operated device through the outlet port 12. The hydraulically operated device may be a clutch of the automatic transmission having a hydraulic chamber. Oil is exhausted to a low-pressure component such as an oil pan through the exhaust port 13.

In this example embodiment, the inlet port 11 is arranged in an end of the valve housing 3 on the left side in FIG. 1, and the outlet port 12 and the exhaust port 13 are oriented substantially along the radial direction of the valve housing 3.

The interior of the valve housing 3 is partitioned into an inlet chamber 14, an outlet chamber 15, and an exhaust chamber 16. The inlet chamber 14, the outlet chamber 15, and the exhaust chamber 16 respectively communicate with the inlet port 11, the outlet port 12, and the exhaust port 13. The inlet chamber 14, the outlet chamber 15, and the exhaust chamber 16 are arranged in order from the left side to the right side in FIG. 1.

The inlet chamber 14 is partitioned from the outlet chamber 15 by an inlet partition wall 17. The outlet chamber 15 is partitioned from the exhaust chamber 16 by an exhaust partition wall 18.

The center of the inlet partition wall 17 has an inlet valve hole 21 that communicates the inlet chamber 14 with the outlet chamber 15. The center of the exhaust partition wall 18 has an exhaust valve hole 22 that communicates the outlet chamber 15 with the exhaust chamber 16. The inlet valve hole 21 and the exhaust valve hole 22 are located along the axial center of the shaft 5.

The ball valve 4 is arranged in the inlet chamber 14. The ball valve 4 is seated onto a seat of the inlet valve hole 21 by hydraulic pressure in the inlet chamber 14. A ball holder 24 is assembled from the end of the valve housing 3 into the inlet chamber 14. The ball holder 24 supports the ball valve 4 such that the ball valve 4 is axially movable in the inlet chamber 14. The ball holder 24 introduces oil supplied from the inlet port 11 into the inlet chamber 14.

The shaft 5 includes a pressing shaft 25, a middle diameter shaft 26, and a large diameter shaft 27 that are arranged in order from the left side, i.e., from the side of the inlet chamber 14 to the right side in FIG. 1.

The pressing shaft 25 is provided to the tip end of the shaft 5 on the left side in FIG. 1. The pressing shaft 25 has the outer diameter that is less than the inner diameters of the inlet valve hole 21 and the exhaust valve hole 22. The pressing shaft 25 is inserted from the outlet chamber 15 into the inlet valve hole 21. The pressing shaft 25 is adapted to moving the ball valve 4 toward the inlet chamber 14.

The middle diameter shaft 26 has the outer diameter that is greater than the outer diameter of the pressing shaft 25. The middle diameter shaft 26 axially movable in the exhaust chamber 16. The pressing shaft 25 and the middle diameter shaft 26 define a step therebetween. This step serves as a step valve 28 that is adapted to be seated from the exhaust chamber 16 onto the seat of the exhaust valve hole 22 thereby blocking the exhaust valve hole 22. That is, the shaft 5 has the step valve 28 midway through the axial direction of the shaft 5.

The large diameter shaft 27 has the outer diameter that is greater than the outer diameter of the middle diameter shaft 26. The large diameter shaft 27 is axially slidable along the inner circumferential periphery of a sleeve 29 that is supported in the solenoid actuator 2.

The return spring 6 is a compression coil spring that is supported in the exhaust chamber 16 for biasing the shaft 5 toward the solenoid actuator 2. The return spring 6 is provided between a spring seat 30 and a step of the large diameter shaft 27 in a compressed manner. The step is located between the middle diameter shaft 26 and the large diameter shaft 27. Thus, the return spring 6 biases the shaft 5 to the right side in FIG. 1.

The solenoid actuator 2 may have a generally known structure constructed of a coil, a moving core, a stator, a yoke, and the like. The moving core is applied with force toward the left side in FIG. 1 corresponding to electricity supplied to the coil. The moving core applies axial force to the shaft 5. As an amount of electricity supplied to the coil increases, the axial force applied from the moving core to the shaft 5 toward the left side in FIG. 1 increases.

Next, a background of this example embodiment is described.

As described, the valve housing 3 has the inlet port 11, the outlet port 12, and the exhaust port 13, which are adapted to communicating with the exterior of the valve housing 3. The valve housing 3 and the insertion hole 101 define an annular gap therebetween. The annular gap is sealed by an inner O-ring 31, a middle O-ring 32, and an outer O-ring 33. The inner O-ring 31 partitions and seals between a high pressure side and an outlet side. The high pressure side is on a supply side communicating with the inlet port 11. The outlet side communicates with the outlet port 12. The middle O-ring 32 partitions and seals between the outlet side and a low pressure side. The low pressure side communicates with the exhaust port 13. The outer O-ring 33 partitions and seals between the low pressure side and the outside of the metallic case 100 and the valve housing 3. The outer O-ring 33 serves as an outermost O-ring.

The three O-rings 31 to 33 are supported by the outer circumferential periphery of the valve housing 3. The outer circumferential periphery of the valve housing 3 has three O-ring grooves 41 to 43 that respectively support the three O-rings 31 to 33.

Specifically, the outer circumferential periphery of the valve housing 3 has an inner O-ring groove 41, a middle O-ring groove 42, and an outer O-ring groove 43. The inner O-ring groove 41 supports the inner O-ring 31. The middle O-ring groove 42 supports the middle O-ring 32. The outer O-ring groove 43 supports the outer O-ring 33. The outer circumferential periphery of the valve housing 3 is in a complicated shape due to defining the three O-ring grooves 41 to 43.

Figure 5:
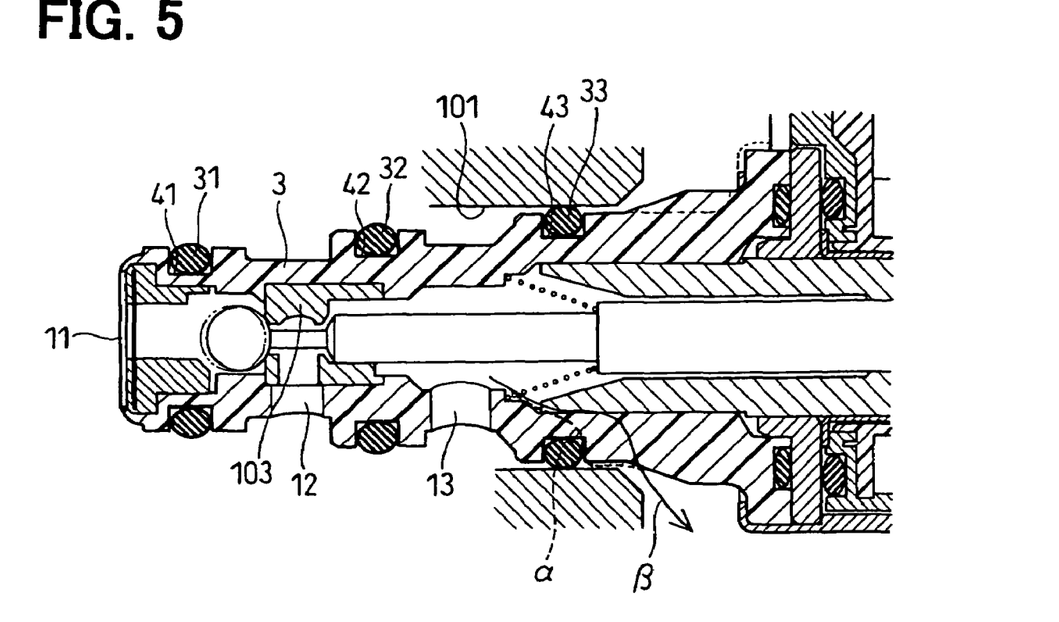
FIGS. 5 to 7 are longitudinal partially sectional views showing solenoid valves according to related arts.

For example, as shown in FIG. 5, it is conceivable to mold the valve housing 3 of resin for reducing manufacturing cost of the valve housing 3 having the outer circumferential periphery in a complicated shape.

Specifically, for example, a valve seat 103, which needs high mechanical strength, may be formed of metal, and components other than the valve seat 103 may be formed of resin, which is excellent in formability.

In this structure, the complicated component may be molded of resin, so that manufacturing cost of the valve housing 3 can de reduced. However, mechanical strength of resin as a base material is lower than mechanical strength of metal. Accordingly, when excessive force is applied to the valve housing 3 formed of resin, the valve housing 3 may crack. Consequently, as depicted by dotted arrow α and solid arrow β, oil may leak to the outside of the metallic case 100 and the valve housing 3. Accordingly, it may be difficult to apply resin for entirely molding the valve housing 3 in consideration of reliability.

Figure 6:
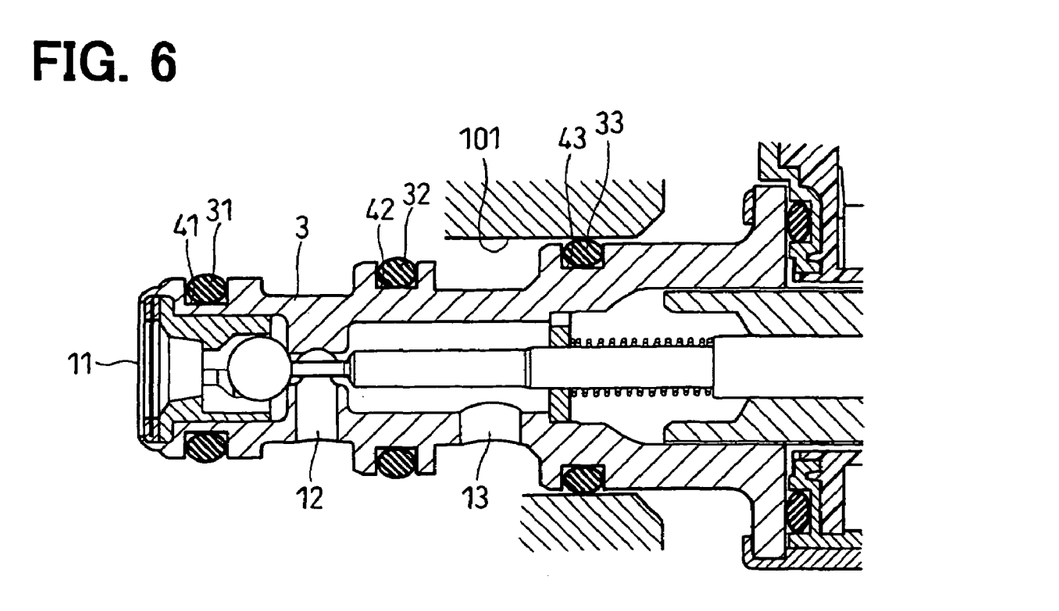

Alternatively, as depicted by FIG. 6, when the valve housing 3 is formed of metal as a base material, the metallic valve housing 3 may be restricted from cracking even when external force is applied to the metallic valve housing 3. However, it is necessary to secondarily apply machining work to the outer circumferential periphery of the metallic valve housing 3 for undercutting the three O-ring grooves 41 to 43. Accordingly, manufacturing cost of the metallic valve housing 3 increases, and cost of the three-way solenoid valve becomes high.

Figure 7:
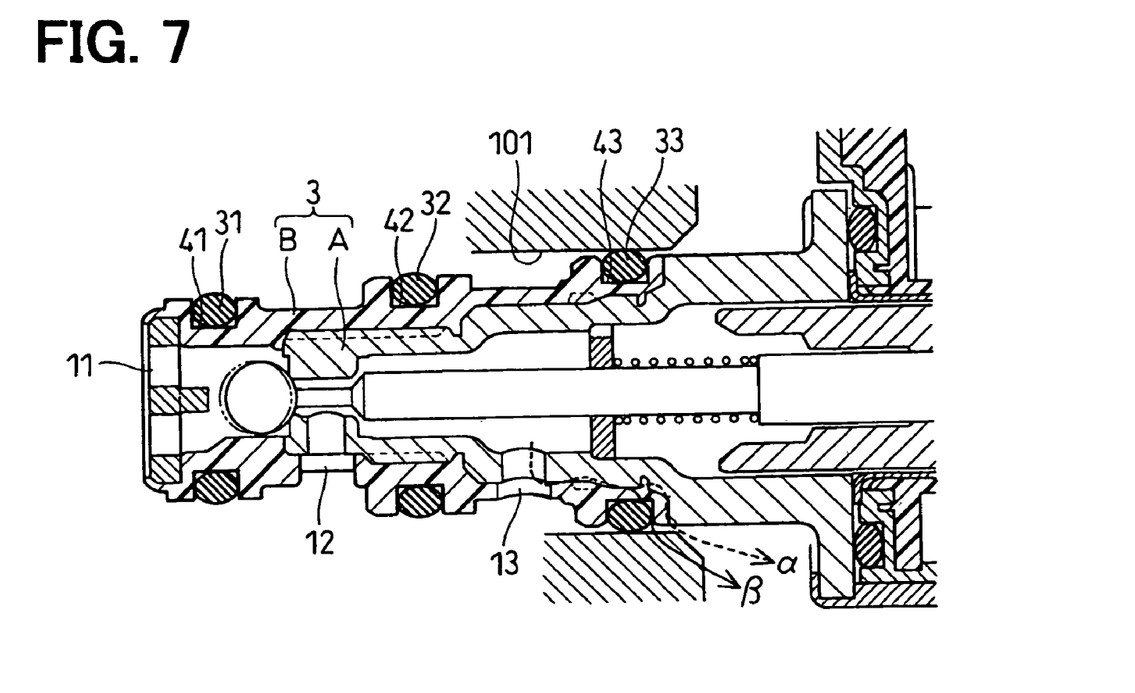

Alternatively, as shown in FIG. 7, it is conceivable that the interior of the valve housing 3 may be provided as a base metallic member A, and the exterior of the valve housing 3 may be provided as an outer resin member B. The exterior of the valve housing 3 has a complicated shape defining the three O-ring grooves 41 to 43.

The base metallic member A is formed by press-forming, forging, or the like, and the outer resin member B is formed by insert molding, for example. Thus, the complicated outer circumferential periphery of the valve housing 3 can be formed at low cost.

However, the thermal expansion coefficients of the outer resin member B and the base metallic member A are different from each other. Accordingly, in this structure, when the valve housing 3 is exposed to cool and hot environment, a gap may arise in the boundary between the outer resin member B and the base metallic member A, which tightly make contact with each other. For example, as depicted by the dotted arrow α in FIG. 7, when a gap arises in the boundary between the outer resin member B, which supports the outer O-ring 33, and the base metallic member A, oil may leak to the outside of the metallic case 100 and the valve housing 3 through the gap.

When excessive force is applied to the valve housing 3, the outer resin member B, which is lower than the base metallic member A in mechanical strength, may crack. Specifically, the outer resin member B may crack in the outer circumferential periphery, around which the outer O-ring 33 surrounds. In this case, as depicted by the solid arrow β in FIG. 7, oil may leak to the outside of the metallic case 100 and the valve housing 3 through the crack.

In this embodiment, the three-way solenoid valve has the following structure for reducing manufacturing cost thereof and for enhancing reliability against leakage of oil.

The valve housing 3 includes a substantially cylindrical base metallic member A and an outer resin member B. The outer resin member B is fixed to the base metallic member A, so that the outer resin member B at least partially defines the outer periphery of the valve housing 3. The base metallic member A is inserted into the insertion hole 101 formed in the metallic case 100 from the outside of the insertion hole 101.

The base metallic member A is formed of a metallic material such as steel being resistive against external force. The base metallic member A is substantially cylindrical. The base metallic member A has a flange A1 in the end on the right side in FIG. 1. The base metallic member A is fixed to the solenoid actuator 2 via the flange A1. The base metallic member A is formed by metal working such as press-forming or forging.

The outer resin member B is formed of resin such as thermosetting resin being resistive against thermal cycling, oil, or the like. The thermosetting resin may be polyphenylene sulfide (PPS). The outer resin member B is insert-molded on the surface of the base metallic member A. The method for fixing the outer resin member B to the base metallic member A is not limited to insert-molding. The outer resin member B may be fixed to the base metallic member A by press-insertion, fitting, bonding, or the like.

The outer resin member B defines the outer circumferential periphery of the valve housing 3. The outer circumferential periphery of the valve housing 3 has the complicated shape. The outer resin member B has the inner O-ring groove 41 and the middle O-ring groove 42. The outer resin member B has an O-ring resin inner wall B1. The O-ring resin inner wall B1 is an example of a resin wall. The O-ring resin inner wall B1 is located on the left side of the outer O-ring groove 43 in FIG. 1. That is, the O-ring resin inner wall B1 is located on the bottom side of the insertion hole 101 in the metallic case 100. The O-ring resin inner wall B1 restricts the outer O-ring 33 from moving toward the left side in FIG. 1. The left side in FIG. 1 is an example of an axial direction.

The O-ring resin inner wall B1 is not provided to the bottom surface of the outer O-ring groove 43 that supports the outer O-ring 33. The bottom surface of the outer O-ring groove 43 of the base metallic member A is uncovered with the O-ring resin inner wall B1. That is, the bottom surface of the outer O-ring groove 43 is exposed circumferentially throughout from the O-ring resin inner wall B1. In this embodiment, the outer O-ring groove 43 is defined by the bottom surface and an outer O-ring wall, which is on the right side in FIG. 1. That is, the outer O-ring wall is located on the outer side (inlet side) of the insertion hole 101. The base metallic member A partially defines the outer O-ring groove 43 by the outer O-ring wall and the bottom surface.

In this structure, the outer O-ring 33 makes contact directly with the outer circumferential periphery of the base metallic member A. The outer O-ring 33 surrounds throughout the outer circumferential periphery of the base metallic member A, thereby steadily sealing between the base metallic member A and the metallic case 100.

In this embodiment, the valve housing 3 of the three-way solenoid valve need not expensive metal work such as undercutting. In this valve housing 3, the base metallic member A defines a portion, which need not expensive manufacturing work even when being formed of metal. The outer resin member B, which is formed by insert-molding or the like, defines a portion that has the complicated shape. The outer resin member B includes the O-ring resin inner wall B1. Thus, the valve housing 3 can be inexpensively manufactured.

The outer circumferential periphery of the base metallic member A makes contact directly with the outer O-ring 33, so that the outer O-ring groove 43 supports the outer O-ring 33. The base metallic member A and the outer O-ring 33 do not interpose a resin member therebetween.

The outer resin member B including the O-ring resin inner wall B1 is tightly fixed to the base metallic member A via the boundary surface therebetween. This boundary surface may cause a gap due to difference in the thermal expansion coefficients between the outer resin member B and the base metallic member A. However, even in this case, the base metallic member A and the outer O-ring 33 can be restricted from causing a gap, through which oil leaks, therebetween, and can be restricted from cracking in a resin member therebetween. In addition, the base metallic member A makes contact directly with the outer O-ring 33 without interposing a resin member, which is low in strength, therebetween. Therefore, even when the valve housing 3 is applied with external force, the base metallic member A and the outer O-ring 33 can be restricted from causing a gap, through which oil leaks, therebetween, and can be restricted from cracking in a resin member therebetween.

Thus, manufacturing cost for the valve housing 3 having a complicated outer circumferential periphery can be reduced. Thus, manufacturing cost for the three-way solenoid valve can be reduced. In addition, at least the outer O-ring 33 can steadily restrict oil from leaking to the outside of the metallic case 100 and the valve housing 3. Thus, reliability of the three-way solenoid valve can be enhanced, so that leakage of oil can be steadily restricted.

Second Embodiment

Figure 2:
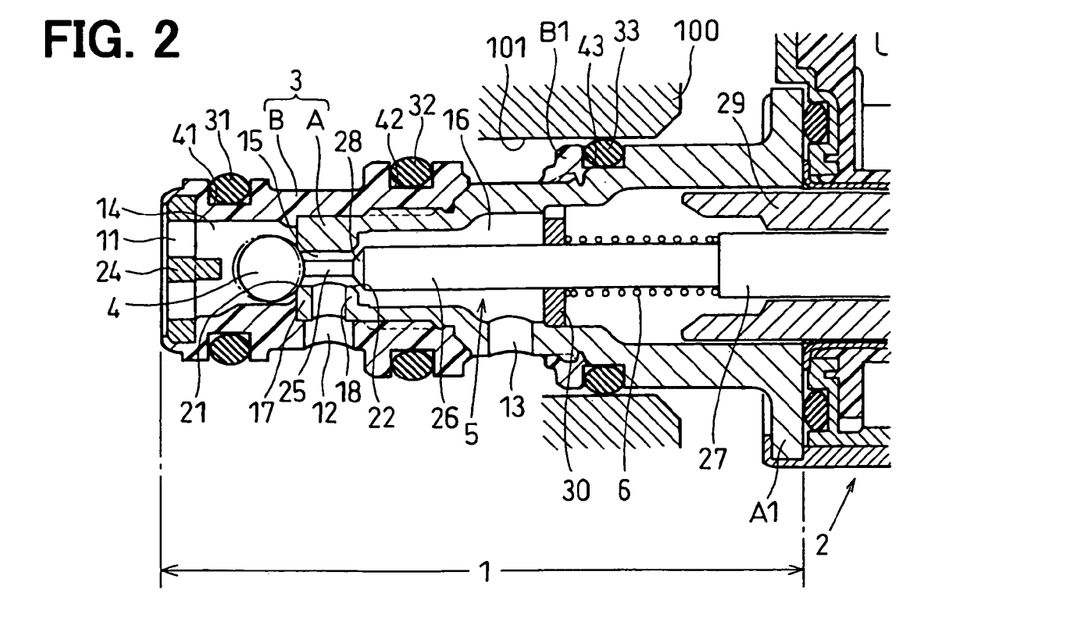
FIG. 2 is a longitudinal partially sectional view showing a solenoid valve according to a second embodiment.

In this second embodiment, as shown in FIG. 2, the O-ring resin inner wall B1 is provided axially separately from the outer resin member B.

In this structure, the O-ring resin inner wall B1 and the base metallic member A may cause strain and misalignment therebetween due to difference in the thermal expansion coefficients. In addition, the outer resin member B and the base metallic member A may cause strain and misalignment therebetween due to difference in the thermal expansion coefficients. These strain and misalignment may be locally caused individually in the O-ring resin inner wall B1 and the outer resin member B. In this embodiment, the solenoid valve can produce an advantage similar to the advantage produced by the structure of the first embodiment.

In addition, even when the solenoid valve is used under a severe environment, in which thermal shock is applied to the solenoid valve, strain and misalignment caused individually in the O-ring resin inner wall B1 and the outer resin member B with respect to the base metallic member A can be restricted from accumulating with each other. Thus, the strain and misalignment caused individually in the O-ring resin inner wall B1 and the outer resin member B can be reduced. Therefore, the solenoid valve can be restricted from causing peeling and cracking even under a thermally severe environment, so that reliability of the solenoid valve can be enhanced.

Third Embodiment

Figure 3:
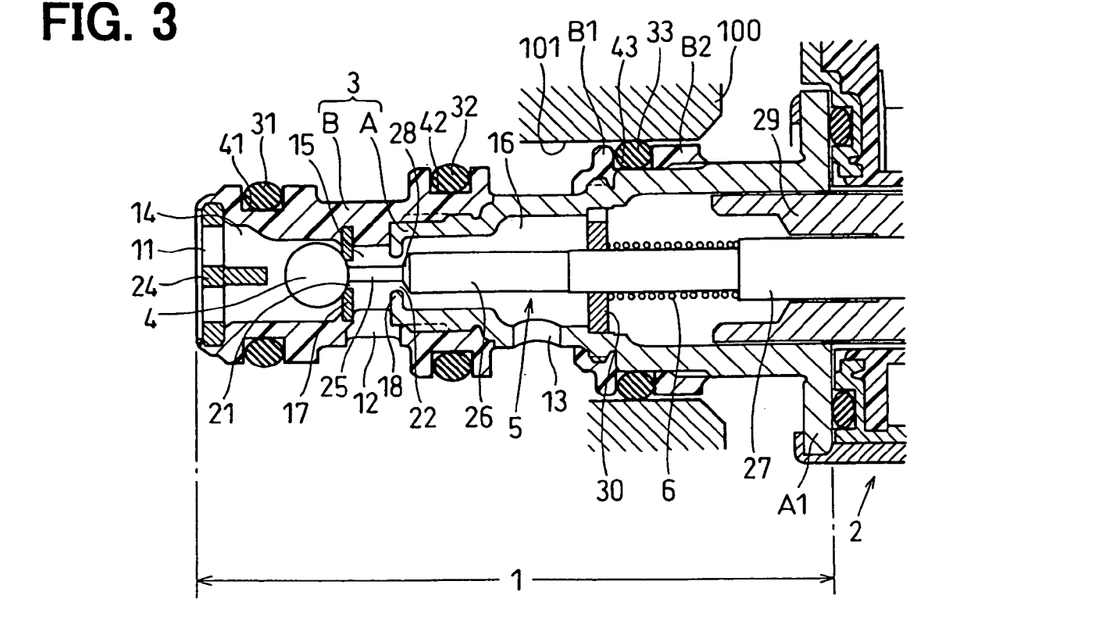
FIG. 3 is a longitudinal partially sectional view showing a solenoid valve according to a third embodiment.

In this third embodiment shown in FIG. 3, the O-ring resin inner wall B1 defines the O-ring wall on the bottom side, i.e., on the left side in FIG. 3 with respect to the outer O-ring groove 43. In addition, an O-ring resin inner wall B2 defines the O-ring wall on the outer side, i.e., on the right side in FIG. 3 with respect to the outer O-ring groove 43. The O-ring resin inner wall B2 is an example of the O-ring resin wall.

In this embodiment, the solenoid valve can produce an advantage similar to the advantage produced by the structure of the first embodiment. In addition, the base metallic member A need not have a step for defining the O-ring resin inner wall B2 located on the outer side, i.e., on the right side in FIG. 3 with respect to the outer O-ring groove 43. Therefore, manufacturing cost for forming the step in the base metallic member A can be reduced.

In this embodiment, the inlet partition wall 17 is provided separately from the base metallic member A. The inlet partition wall 17 may be shaped by press-forming, and may be inert-molded in the outer resin member B.

Fourth Embodiment

Figure 4:
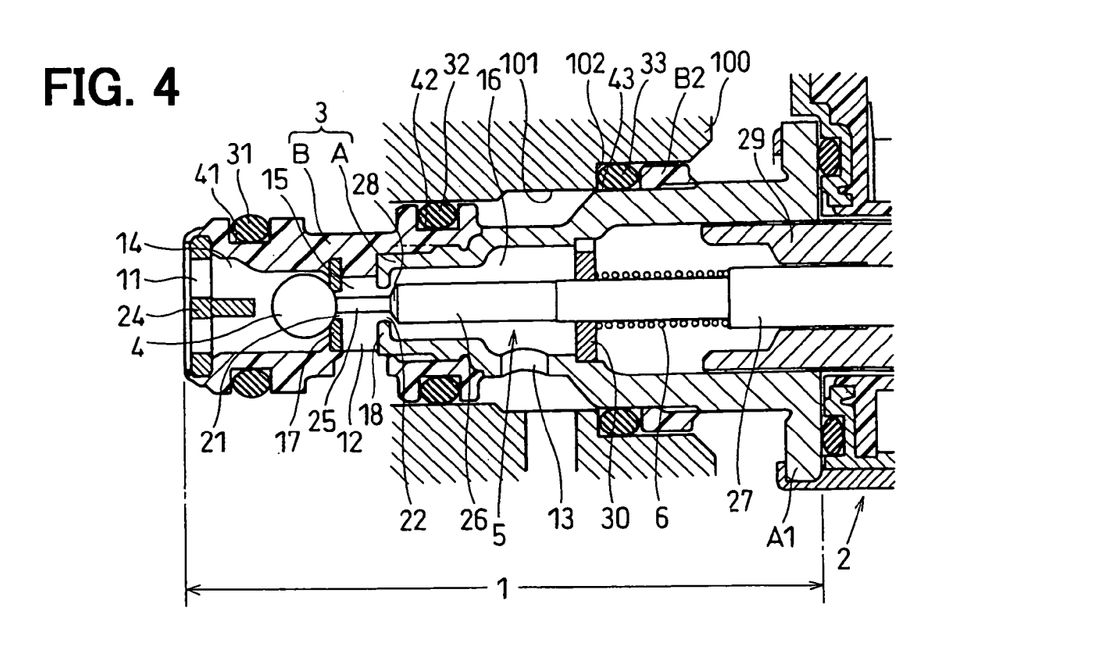
FIG. 4 is a longitudinal partially sectional view showing a solenoid valve according to a fourth embodiment.

In this forth embodiment, as shown in FIG. 4, the outer O-ring 33 is externally restricted from axially moving by the O-ring resin inner wall B2, similarly to the third embodiment. The insertion hole 101 defines a step 102 that axially restricts the bottom side of the outer O-ring 33.

In this embodiment, the solenoid valve can produce an advantage similar to the first embodiment. In addition, the O-ring resin inner wall B1 in the above embodiments can be omitted.

Modification

The base metallic member A may be exposed from at least one of the bottom surfaces of the inner O-ring groove 41 and the middle O-ring groove 42.

The inner O-ring groove 41 and the middle O-ring groove 42 may be individually defined respectively in outer resin members B, which are separately provided.

The number of the O-ring may be one. Alternatively, the number of the O-rings may be two, four or more.

The above structure may be applied to a three-way valve for an apparatus other than an automatic transmission.

The above structure may be applied to a solenoid valve having another valve member such as a substantially conical valve member and a substantially cylindrical spool. The above structure may be applied to another solenoid valve having another switching structure such as mechanisms of a two-way valve and a four-way valve. The above structure may be applied to another actuator apparatus that needs a waterproof property and/or a pressure-resistant property. The above structure may be applied to a sealed structure for a housing of a sensor device.

The above structures of the embodiments can be combined as appropriate.

Various modifications and alternations may be diversely made to the above embodiments without departing from the spirit of the present invention.

What is claimed is:

1. A valve apparatus that is adapted to be at least partially inserted into an insertion hole of a counterpart member, the valve apparatus comprising:
   a housing that is adapted to be inserted from an outside of the insertion hole into the insertion hole, the housing and the insertion hole defining an annular gap therebetween; and
   at least one O-ring that seals the annular gap, wherein
   the housing includes a base metallic member and an outer resin member,
   the base metallic member is substantially cylindrical, the base metallic member being inserted into the insertion hole,
   the outer resin member is fixed to the base metallic member, the outer resin member at least partially defining an outer circumferential periphery of the housing,
   the base metallic member defines a bottom surface of a groove that supports the at least one O-ring, the bottom surface of the groove being exposed circumferentially throughout from the outer resin member,
   the outer resin member defines a resin wall that restricts the at least one O-ring from axially moving, and wherein
   the base metallic member has a cylindrical portion extending from a portion where the bottom surface is formed to an axial end of the base metallic member, the cylindrical portion being formed smaller than the bottom surface in a diametrical direction.

2. The valve apparatus according to claim 1,
   wherein the at least one O-ring includes a plurality of O-rings having an outermost O-ring that is located in the vicinity of the outside of the insertion hole,
   the resin wall partially defines the groove,
   the groove supports at least the outermost O-ring, and
   the outermost O-ring has an inner circumferential periphery that makes contact directly with the base metallic member.

3. The valve apparatus according to claim 1,
   wherein the housing further includes a peripheral resin member that partially surrounds the outer circumferential periphery of the base metallic member, the peripheral resin member partially defining the outer circumferential periphery of the housing, and the resin wall is axially separate from the peripheral resin member.

4. The valve apparatus according to claim 2, wherein the resin wall is axially separate from the outer resin member.

5. The valve apparatus according to claim 1, further comprising:
a movable member that is axially movable in the housing; and
an electric actuator that operates the movable member in accordance with an amount of the electricity supplied to the electric actuator.

6. The valve apparatus according to claim 5,
wherein the housing has an inlet port, an outlet port, and an exhaust port,
the electric actuator controls communication among the inlet port, through which fluid flows into the housing, the outlet port, through which output fluid flows out of the housing, and the exhaust port, through which fluid is exhausted from the housing, by operating the movable member, and
the electric actuator controls fluid flowing through the inlet port, the outlet port, and the exhaust port for switching pressure of the output fluid, controlling pressure of the output fluid, or controlling an amount of the output fluid.

7. The valve apparatus according to claim 1, wherein
the housing defines a port on the cylindrical portion of the base metallic member, and
the O-ring located on the bottom surface is an outermost O-ring that partitions and seals between the port and the outside.

8. The valve apparatus according to claim 7, wherein the base metallic member has a flange portion where a solenoid actuator is fixed to, the flange portion has a largest diameter among the cylindrical portion and the portion where the bottom surface is formed, so that the base metallic member is decreased in diameter from the flange portion through the portion where the bottom surface is formed to the cylindrical portion.

9. valve apparatus comprising:
a housing; and
at least one O-ring that is provided to an outer periphery of the housing,
wherein
the housing includes a base metallic member and an outer resin member,
the base metallic member is substantially cylindrical,
the outer resin member partially surrounds an outer circumferential periphery of the base metallic member,
the outer resin member and the outer circumferential periphery of the base metallic member define a groove having a bottom surface,
the outer circumferential periphery of the base metallic member defines the bottom surface that is exposed circumferentially throughout from the outer resin member,
the outer resin member defines a resin wall being adjacent to the bottom surface,
the at least one O-ring circumferentially surrounds the bottom surface,
the resin wall axially faces to the at least one O-ring, and wherein
the base metallic member has a cylindrical portion extending from a portion where the bottom surface is formed to an axial end of the base metallic member, the cylindrical portion being formed smaller than the bottom surface in a diametrical direction.

10. The valve apparatus according to claim 9, wherein the resin wall is substantially annular.

11. The valve apparatus according to claim 9, wherein the at least one O-ring directly surrounds the bottom surface of the groove.

12. The valve apparatus according to claim 9,
wherein the housing further includes a peripheral resin member that partially surrounds the outer circumferential periphery of the base metallic member, the peripheral resin member partially defining the outer circumferential periphery of the housing, and
the resin wall is axially separate from the peripheral resin member.

13. The valve apparatus according to claim 9, wherein the resin wall is axially separate from the outer resin member.

14. The valve apparatus according to claim 9, further comprising:
a movable member that is axially movable in the housing; and
an electric actuator that operates the movable member in accordance with an amount of the electricity supplied to the electric actuator.

15. The valve apparatus according to claim 14,
wherein the electric actuator is provided to one end of the housing,
the at least one O-ring includes a plurality of O-rings having an outermost O-ring that is located in the vicinity of the electric actuator,
the resin wall partially defines the groove that supports at least the outermost O-ring, and
the outermost O-ring has an inner circumferential periphery that makes contact directly with the base metallic member.

16. The valve apparatus according to claim 14,
wherein the housing has an inlet port, an outlet port, and an exhaust port,
the electric actuator operates the movable member to control communication among the inlet port, through which fluid flows into the housing, the outlet port, through which output fluid flows out of the housing, and the exhaust port, through which fluid is exhausted from the housing, so that the electric actuator conducts at least one of the following operations:
switching pressure of the output fluid;
controlling pressure of the output fluid; and
controlling an amount of the output fluid.

17. The valve apparatus according to claim 9, wherein
the housing defines a port on the cylindrical portion of the base metallic member, and
the O-ring located on the bottom surface is an outermost O-ring that partitions and seals between the port and the outside.

18. The valve apparatus according to claim 17, wherein the base metallic member has a flange portion where a solenoid actuator is fixed to, the flange portion has a largest diameter among the cylindrical portion and the portion where the bottom surface is formed, so that the base metallic member is decreased in diameter from the flange portion through the portion where the bottom surface is formed to the cylindrical portion.

19. A valve apparatus comprising:
a housing; and
an O-ring that is provided to an outer periphery of the housing,
wherein
the housing includes a base metallic member and an outer resin member, the base metallic member is substantially cylindrical,
the outer resin member partially surrounds an outer circumferential periphery of the base metallic member,
the outer resin member and the outer circumferential periphery of the base metallic member define a groove having a bottom surface,
the outer circumferential periphery of the base metallic member defines the bottom surface that is exposed circumferentially throughout from the outer resin member,
the outer resin member defines a resin wall being adjacent to the bottom surface,
the O-ring circumferentially surrounds the bottom surface,
the O-ring has an inner circumferential periphery that makes contact directly with the bottom surface,
the resin wall axially faces to the O-ring, and wherein
the base metallic member has a cylindrical portion extending from a portion where the bottom surface is formed to an axial end of the base metallic member, the cylindrical portion being formed smaller than the bottom surface in a diametrical direction.

20. The valve apparatus according to claim 19, wherein
the housing defines a port on the cylindrical portion of the base metallic member, and
the O-ring located on the bottom surface is an outermost O-ring that partitions and seals between the port and the outside.

\* \* \* \* \*